C. D. McCONNELL AND J. M. BRYSON.
RUNNING, STARTING, AND BURNING-IN ATTACHMENT FOR MOTOR HANDLING MACHINES.
APPLICATION FILED JAN. 31, 1920.
1,382,659.
Patented June 28, 1921.
3 SHEETS—SHEET 3.
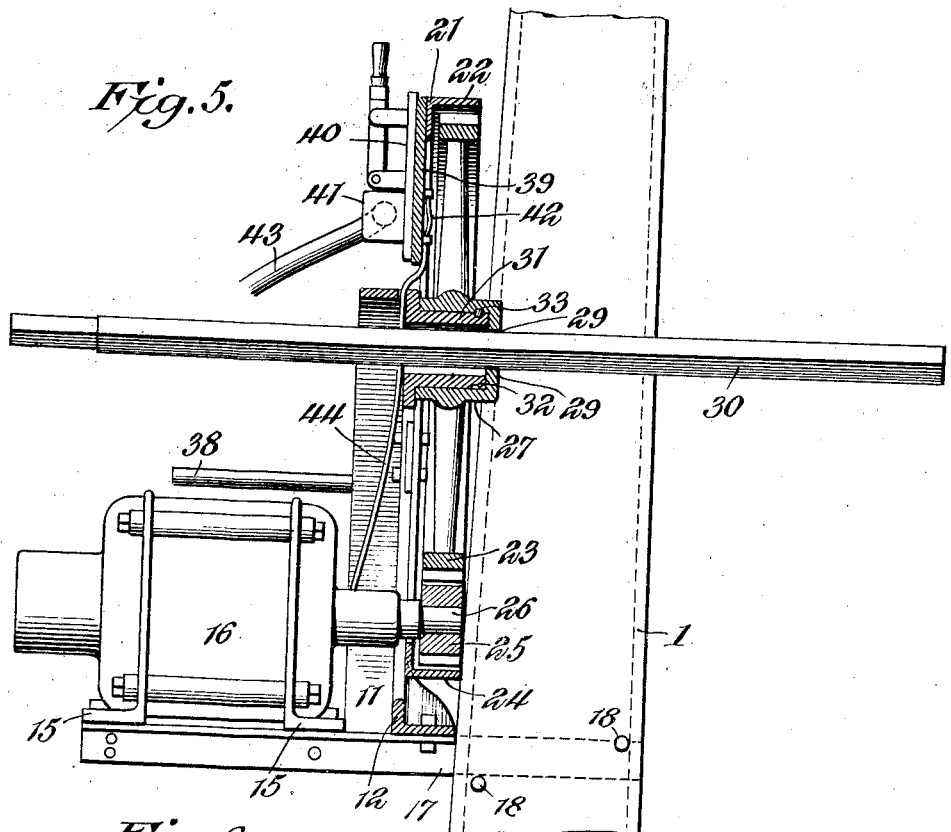
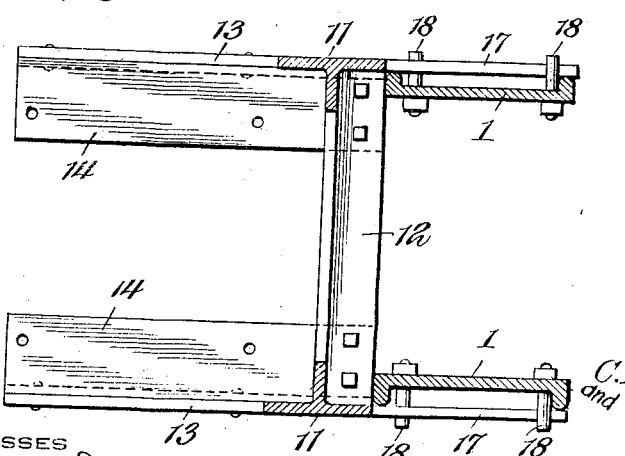
WITNESSES
Howard D. Orr.
F. T. Chapman
C. D. McConnell
and J. M. Bryson,
INVENTORS
BY C. G. Siggers
ATTORNEY

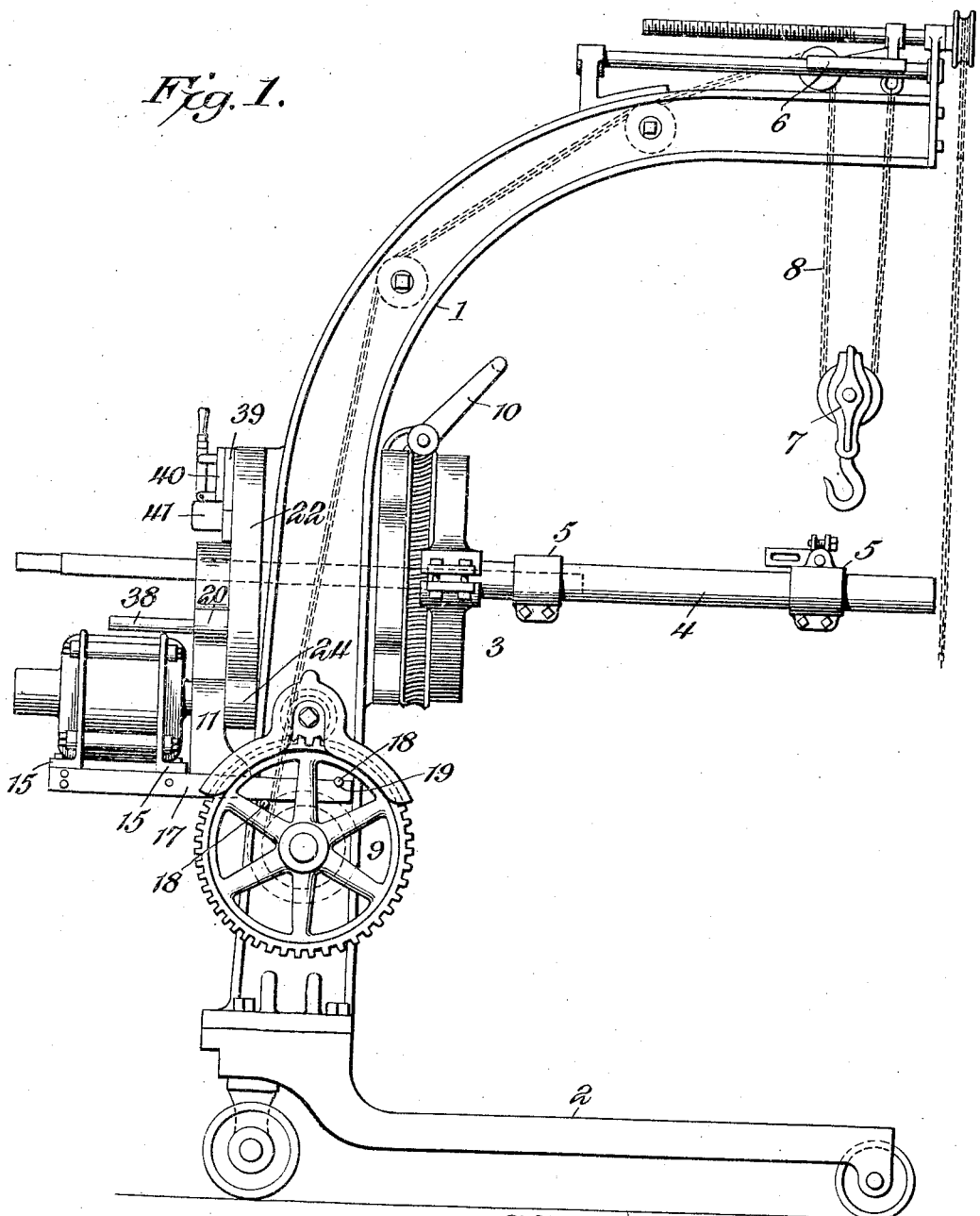

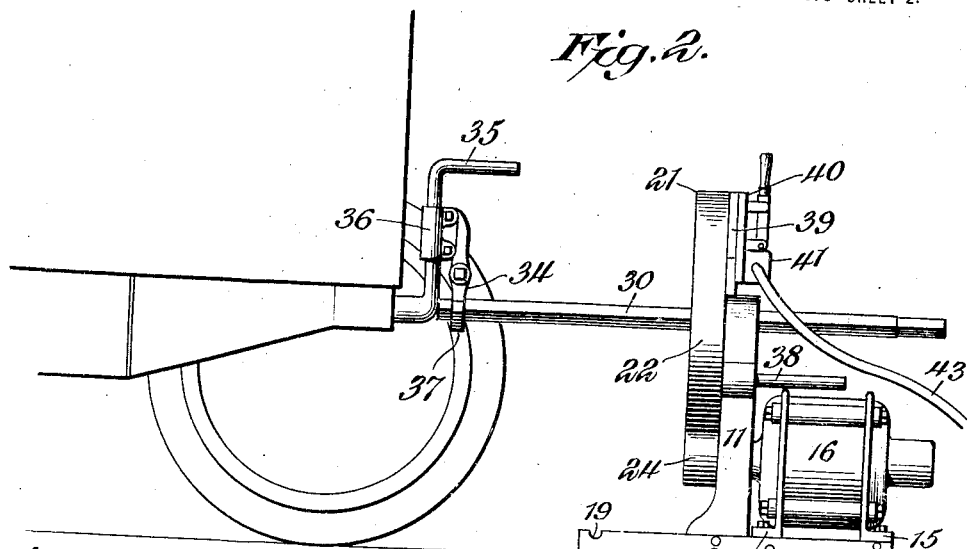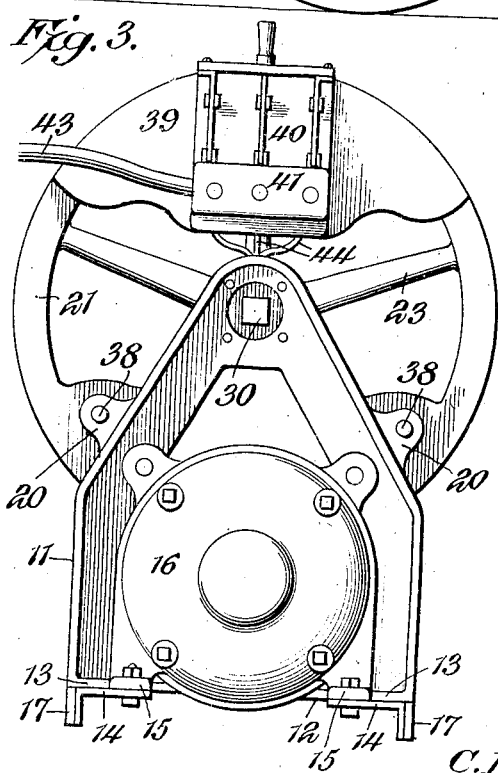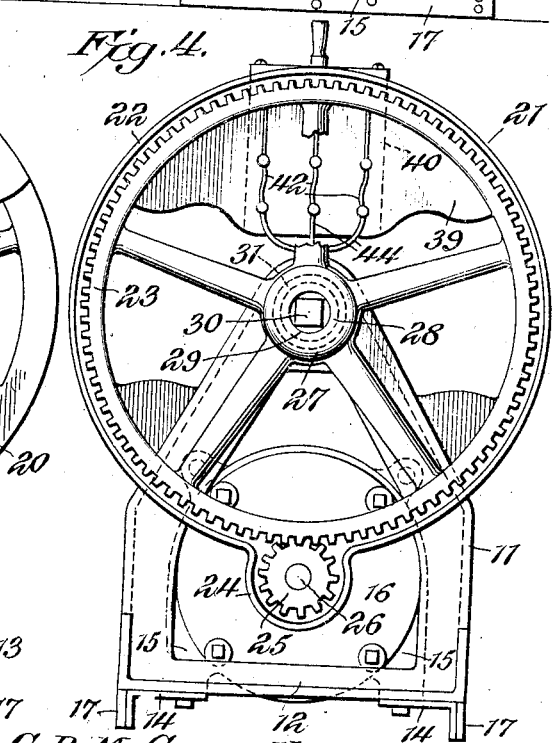

UNITED STATES PATENT OFFICE.

CHARLES D. McCONNELL AND JOHN MARTIN BRYSON, OF OSKALOOSA, IOWA.

RUNNING, STARTING, AND BURNING-IN ATTACHMENT FOR MOTOR-HANDLING MACHINES.

1,382,659.  Specification of Letters Patent.  Patented June 28, 1921.

Application filed January 31, 1920. Serial No. 355,423.

*To all whom it may concern:*

Be it known that we, CHARLES D. McCONNELL and JOHN M. BRYSON, citizens of the United States, residing at Oskaloosa, in the county of Mahaska and State of Iowa, have invented a new and useful Running, Starting, and Burning-In Attachment for Motor-Handling Machines, of which the following is a specification.

This invention has reference to running, starting and burning-in attachments for motor handling machines, and its object is to provide an attachment which may be used, either in connection with or separately from, the motor handling machine so that in the case of a hard starting motor the attachment may be applied directly to a completed automobile to start the automobile motor where such starting, either by hand or by the usual starting motor of the automobile, is not feasible.

The attachment is designed particularly for use in connection with the motor handling machine shown and described in our application Serial No. 245,514, filed July 18, 1918, although not necessarily confined to a motor handling machine of the particular construction therein shown.

The invention is characterized by the employment of a power unit including an electric motor with a carrier or support and gearing mounted thereon and connected to the motor to be driven thereby. The gearing is provided with means whereby it may be readily attached to the starting crank of the automobile engine, and the structure is so organized that it may be transported with and form a part of the motor handling machine for use in connection with the motor when removed from the chassis of the automobile and carried on the motor handling machine, or may be readily removed from the motor handling machine and placed in operative relation to the front of an automobile to be coupled to the usual cranking handle for turning over the engine by power to start it.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a side elevation of a motor handling machine with the attachment applied.

Fig. 2 is a side elevation showing the attachment separate from the motor handling machine and applied to the starting crank of an automobile.

Fig. 3 is a front elevation of the attachment.

Fig. 4 is a rear elevation thereof.

Fig. 5 is a detail section through the attachment and a portion of the motor handling machine as seen in Fig. 1.

Fig. 6 is a plan view of the motor supporting frame with a portion of said frame and of the adjacent parts of the motor handling machine in cross section.

Referring to the drawings, there is shown in Fig. 1 a crane 1 rising from one end of a truck 2 and overhanging the latter. Carried by the crane at an intermediate point of its height is a bed rail frame 3 provided with rails 4 properly spaced and equipped with clamp devices 5 whereby to receive and hold an automobile explosion engine. Provision is made for rotating the bed rail frame about a substantially horizontal axis, and on top of the crane is a carriage 6 supporting a hook block 7 with a lifting chain 8. At a convenient point on the crane is a windlass 9 receiving the chain. The bed rail frame has a manipulating crank handle 10 whereby the frame may be rotated about its horizontal axis. The parts so far described are shown in our aforesaid application, and it is for such a machine that the present invention constitutes an attachment and is also capable of use separate from the motor handling machine. In operation, the motor handling machine is moved with relation to an automobile so that the truck 2 may underride the automobile with the crane overhanging the engine of the automobile, whereupon, after loosening the engine the hook block 7 is attached to the engine and the latter lifted from the frame of the automobile and secured to the bed rail frame so that the whole structure with the engine supported thereby may be moved away from the automobile for such manipulation as may be desired.

The attachment comprises an arch frame 11 which, for lightness and strength, may be in the form of a web and flange casting. The basic portion of the arch frame, indicated at 12, has arms 13, either cast on or secured thereto, these arms being in substantially parallel relation and projecting from one face of the basic portion 12 of the frame and where the web and flange construction with flanges 14 constitutes supports for opposite leg portions 15 of an electric motor 16, the latter being of any appropriate type for the purposes of the invention. Projecting from the opposite face of the frame 11 and also in parallel relation to each other are arms 17 which may aline with the arms 13 and are spaced far enough apart to straddle the sides of the upright or standard of the crane 1.

By means of pins 18 made fast to and projecting outwardly from the sides of the crane and spaced one above the other by a distance approximating the height of the arms 17, the frame 12 with the motor 16 thereon, may be readily supported in approximately horizontal position on the crane about midway of the height of the latter, the positioning of the pins being such that the arms 17 cramp in place and hold their position by reason of the weight of the frame and motor carried by the frame. To prevent longitudinal movement of the arms 17, each has a suitably located notch 19 near one end to seat the corresponding pin 18. It is to be understood, of course, that other means may be employed for sustaining the motor and its carrying frame and also the frame 11 and parts sustained thereby on the crane.

The frame 11 is provided on opposite sides with ears 20, to which is secured a guard or housing 21 of generally cylindrical form and having an overhang flange 22 of suitable internal diameter and also of suitable depth to receive a gear wheel 23. The housing 21 has an offset 24 of a size to receive a gear pinion 25 on one end of the armature shaft 26 of the motor 16 so as to be in mesh with the gear wheel 23 and so be constantly coupled to the motor. The gear wheel 23 is provided with a hub portion 27 having a closed end or head 28 except that this head is provided with a central passage 29 of a size and shape to be traversed by a bar 30 shown as of square shape in cross section, although such particular shape is not obligatory. The hub 27 is mounted to rotate upon a hollow stub shaft 31 formed on the frame 11 at the apex of the arch portion thereof. To hold the gear wheel onto the stub shaft 31, the shaft is provided with a circular groove 32, while the hub 27 carries a pin 33 entering the groove 32.

The bar 30 is capable of longitudinal movement through the passage 29 so that it may be connected to the engine shaft of the automobile. Such connection may be accomplished by means of a clamp 34 or other suitable connection with the crank handle 35 of the automobile engine or in any other manner, whereby rotative movements of the gear wheel 23 will cause similar rotative movements of the engine shaft. The clamp 34 may be of a construction permitting it to be attached to the crank as by a grip or clasp 36 at one end with the other end formed with an eye 37 through which the bar 30 may be extended.

When the automobile engine is supported by the bed rail frame 3 and the attachment is mounted on the crane 1, the bar 30 alines substantially with the engine crank shaft to cause the engine shaft to be rotated when the electric motor 16 is energized. This arrangement is of value in burning or running in bearings in an overhauled engine, so that before the engine is replaced in the autmobile the overhauled moving parts suitably fit.

The frame 11 is provided with projecting rods 38 serving as handles, whereby the attachment may be lifted onto the crane or removed therefrom and moved into operative position with relation to an automobile. The attachment is then particularly valuable for starting stiff engines or engines which refuse to start under ordinary cranking, either by hand or by the usual starter. In the case of stiff engines, the attachment is such as to possess ample power for the purpose. The stiffness of the engine may be due to various causes, including adjustments of bearings or other parts accomplished without the necessity of removing the engine from the chassis. Under such circumstances, the attachment, removed from the motor handling machine, is readily placed in front of the automobile and the clamp 34 is coupled to the starting crank 35 and the motor 16 energized, whereupon the engine is driven so long as may be needed to limber up the engine bearings so that the engine will thereafter run smoothly and easily. The attachment is so proportioned that it may rest upon the floor or other support on which the automobile is resting and the rod 30 will aline or approximately aline with the engine shaft, the flexibility of the clamp 34 taking care of any out-of-alinement which may be present.

The guard 21 is provided with a switchboard 39 which may be attached to or cast in one piece with the guard, and fast to the switchboard is an electric switch 40 with which is associated a fuse box 41. In Fig. 4, fuses 42 are indicated, a main cable 43 is furnished to conduct the cable from a suitable source to the switch, while conductors 44 distribute to the motor.

While the attachment may be used by itself in connection with an automobile motor installed in the automobile, its adaptability to the motor handling machine materially increases the utility of the latter so that the same instrumentality is susceptible of use without necessity of dismantling the automobile and may be utilized as a part of the motor handling machine for action upon the motor outside of the automobile whereby the automobile motor, after being overhauled, may be put into good running shape and before being restored to the automobile.

What is claimed is:—

1. A running, starting and burning-in attachment for automobile-engines handling machines comprising a suitable frame, an electric motor attached to the frame, a rotatable member carried by the frame for connection to the crank shaft of an automobile engine, gearing between the electric motor and the rotatable member, and readily removable connections between the frame and engine handling machine, whereby the attachment may be used with the engine handling machine or separate therefrom at will.

2. Means for the purpose described, comprising a frame with basic supporting means, a guard or housing carried by the supporting means, a gear wheel mounted in the guard or housing, an electric motor carried by the frame and connected to the gear wheel for driving the latter, and a rotatable member connected to the gear wheel and slidable axially with respect to the latter, whereby the slidable member may be utilized to impart rotary movements to an automobile engine for starting or running the engine or for burning-in or smoothing bearings in an overhauled engine.

3. Means for the purpose described, comprising a truck with a crane thereon, motor handling means carried by the crane, and an automobile engine rotating means also carried by the crane and provided with power means and connections for rotating the drive shaft of the automobile engine carried by the crane, whereby to run the engine when removed from the automobile after the engine has been overhauled and before restoring it to its place in the automobile.

4. Means for the purpose described, comprising a truck with a crane thereon, engine handling means carried by the crane, and engine driving means also carried by the crane and provided with power means, and connections for rotating the drive shaft of the engine carried by the crane whereby to run the engine, when removed from the automobile, after the engine has been overhauled and before restoring it to its place in the automobile, the engine driving means having readily removable supporting means for permitting the use of the driving means independently of the truck and crane.

5. Means for the purpose described comprising a truck and crane thereon for carrying an automobile engine separate from the automobile, and a structure having means supporting it on the crane in axial alinement with the engine carrying means on the crane and provided with power means for attachment to the power shaft on the engine to drive the engine independently of its own power, said attachment being removable as a whole from the crane and provided with basic supporting means whereby the driving means may be connected to an automobile engine in place in the automobile for use in starting a stiff engine.

6. Means for the purpose described comprising a portable frame with a basic supporting portion, an electric motor on the frame, intermeshing gearing carried by the frame and connected to the drive shaft of the electric motor, and a longitudinally adjustable bar carried by the gearing and slidable through the gearing lengthwise of the bar for coupling it to the drive shaft of an automobile engine to start the latter.

7. Starting means for an automobile engine in the installed position, comprising a frame with an extended basic portion on which the frame is erected, an electric motor carried by the basic portion, gearing on the frame and coupled to the electric motor, with the gearing on the frame having an axis of rotation at approximately the height of the power shaft of the automobile engine, a rotatable bar movable lengthwise of the axis of rotation of the gearing on the frame and connected to said gearing, and means whereby the bar may be coupled to the automobile engine shaft for driving the latter, with the basic portion of the frame on substantially a level with the wheel base of the automobile.

8. Means for the purpose described comprising a basic support, a frame uprising therefrom, an electric motor mounted on the basic support to one side of the frame, gearing carried by the frame and connected to the electric motor, and a rotatable member connected to and slidable lengthwise at the axis of rotation of the gearing, whereby the slidable member may be utilized to impart rotary movements to the crank shaft of an automobile engine for operating the latter while in place on the automobile.

9. Means for the purpose described comprising a basic support, a frame uprising therefrom, an electric motor mounted on the basic support to one side of the frame, gearing carried by the frame and connected to the electric motor, and a rotatable member connected to and slidable lengthwise at the axis of rotation of the gearing, whereby the slidable member may be utilized to impart rotary movements to the crank shaft of an automobile engine for operating the latter while in place on the automobile, the rotatable member being in the form of a bar of non-circular cross section, and means for securing the bar to the crank shaft of the automobile.

10. Means for the purpose described, comprising a truck and crane thereon for carrying an automobile engine separate from the automobile, and a structure comprising a frame with an extended basic portion with side arms having longitudinally spaced means whereby the weight of the frame will temporarly lock the frame to the crane for removal therefrom at will, an electric motor on the frame, reducing gearing driven by the motor and mounted on the frame, and a slidable rotatable member in position to be driven by the electric motor, whereby the motor may be coupled to an automobile engine carried by the crane for rotating the engine when removed from the automobile or the motor and carrying frame may be removed from the crane for driving the automobile engine irrespective of the crane.

In testimony, that we claim the foregoing as our own, we have hereto affixed our signatures in the presence of two witnesses.

CHARLES D. McCONNELL.
JOHN MARTIN BRYSON.

Witnesses:
THELMA AIKEN,
LOIS CONEY.